Aug. 30, 1966     R. E. SEELY     3,270,223
DYNAMOELECTRIC MACHINE
Filed Dec. 26, 1962     2 Sheets-Sheet 1
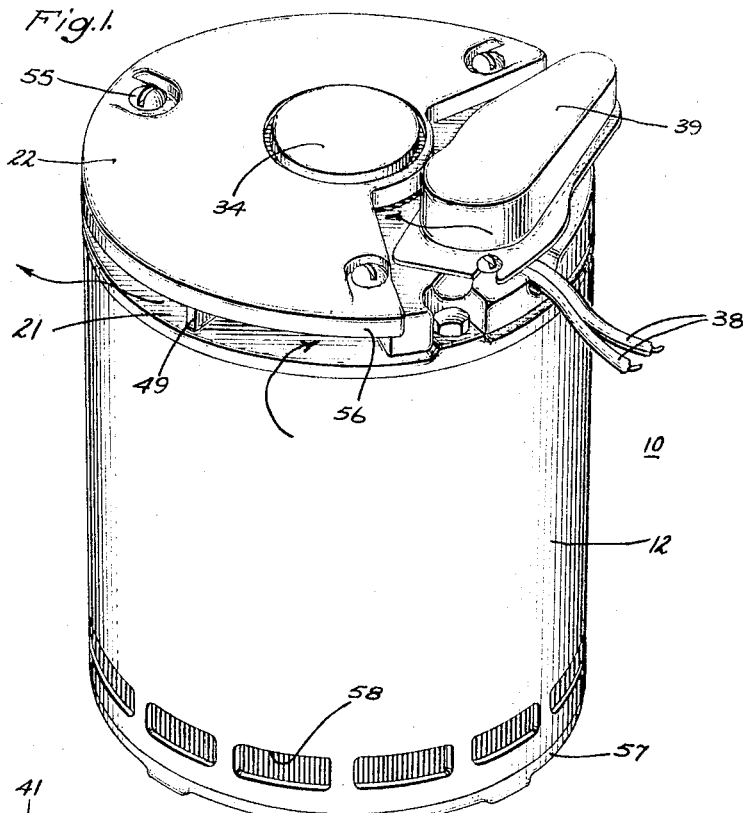
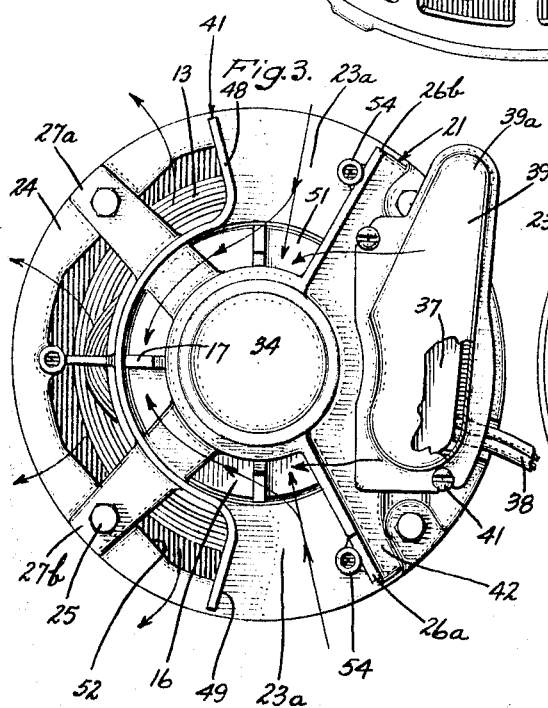
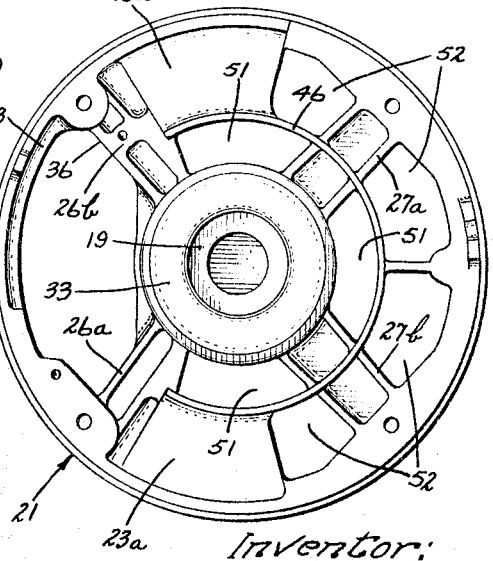
Inventor:
Richard E. Seely,
by John M. Stoudt
Attorney.

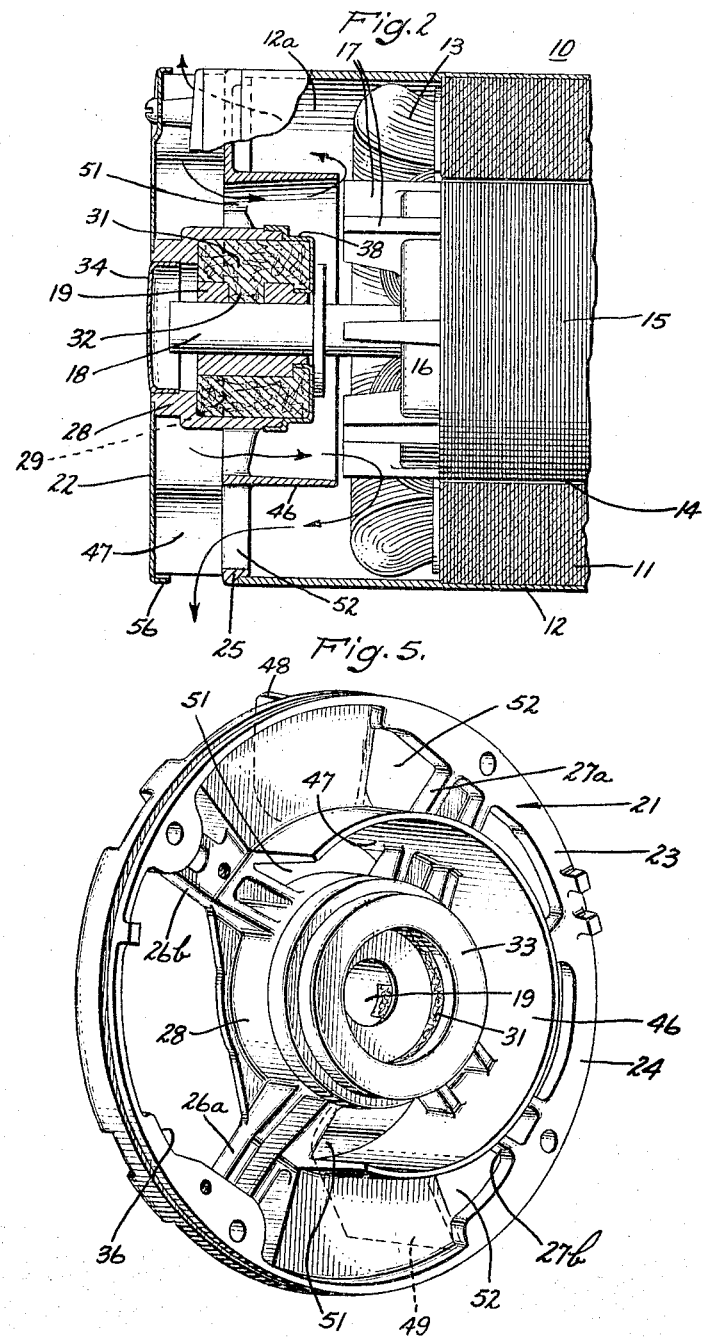

United States Patent Office 3,270,223
Patented August 30, 1966

3,270,223
DYNAMOELECTRIC MACHINE
Richard E. Seely, Fort Wayne, Ind., assignor to General Electric Company, a corporation of New York
Filed Dec. 26, 1962, Ser. No. 247,153
8 Claims. (Cl. 310—62)

This invention relates generally to dynamoelectric machines and more particularly to an improved yet inexpensive construction which provides a positive ventilation arrangement, especially suitable for use in substantially enclosed dynamoelectric machines, such as sump pump motors and the like.

For many years, dynamoelectric machines have been widely employed in applications requiring a substantially enclosed or splash-proof protected unit. Illustrative of this general type of machine is a sump pump motor of the liquid level responsive kind used to prevent the flooding of basements in homes and office buildings caused by water seepage and inadequate sewer capacities, among other reasons. Such motors are conventionally constructed with the electric motor mounted vertically above and operatively connected, through the motor shaft, to a pumping unit disposed in the bottom of a pit, known as a sump.

A serious problem with devices of this nature has been the practical difficulty encountered in providing a positive, yet inexpensive, ventilation system for effectively cooling the internal motor components, such as the windings, and at the same time, one which will prevent the excessive entrance of moisture into the motor interior such as might occur, for instance, when a basement is being "hosed down" during cleaning. In an effort to obtain the desired cooling effect, to keep turbulence and recirculation of air at a minimum, and to prevent the excessive entry of moisture, past suggested approaches known to me have been characterized by a great number of air directing parts which involved undesirable expense. Moreover, such past approaches often resulted in impeding not only the passage of the air through the motors, but also efficient motor manufacture and maintenance due to the time and labor required for assembly and disassembly of the ventilation components.

Accordingly, it is a general object of the present invention to provide an improved ventilating arrangement for dynamoelectric machines, and it is a more specific object to provide an arrangement which overcomes the shortcomings of past approaches mentioned above.

It is another object of this invention to provide an improved electric motor having a ventilation arrangement which is simplified in construction, provides a positive flow pattern of coolant for cooling internal motor components, and facilitates the efficient and inexpensive manufacture and maintenance of the unit in which it is employed.

It is a further object of the invention to provide an improved yet low cost ventilation construction, especially suitable for use in substantially enclosed or splash-proof protected motor units, which is effective to prevent the excessive transmission of moisture and foreign material into the motor interior and the recirculation of heated cooling fluid back into the motor.

In carrying out the objects in one form, I provide a dynamoelectric machine with a stator, rotor and fan mounted to a shaft, and end frame means for directing air and for supporting a shaft journaling bearing. In the illustrated embodiment, the frame means includes at least one member cast in a single piece having inner and outer sections in which the inner section provides a housing for supporting the bearing. A pair of integrally formed axially aligned partitions are furnished intermediate the inner and outer sections, with one of the partitions projecting axially away from the machine interior and the other extending adjacent the fan means. A number of air intake openings are formed between the inner section and the partitions for introducing cooling air through the end frame member directly to the fan means, with a solid wall extending from the outer section to the air intake openings for directing air thereto.

Air exhaust openings are included immediately outward of the partitions for discharging the heated air through the end frame from the machine. Cover means is attached over the end of the frame, in engagement with the one partition, and with the end frame defines separate and distinct channels or paths for introducing and discharging coolant respectively into and out of the machine interior. Among other features, the present invention provides a positive flow pattern which is effective to prevent both recirculation of the heated air back into the machine and the entrance of excessive moisture to the machine interior by an inexpensive arrangement.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawings in which:

FIG. 1 is a view in perspective of a sump pump motor incorporating the preferred embodiment of the improved ventilation arrangement of the present invention;

FIG. 2 is a view in section of the upper part of the motor as seen in FIG. 1;

FIG. 3 is a plan view of the motor of FIG. 1, with the top cover removed to show details;

FIG. 4 is a view of the bearing support and coolant flow directing frame member shown in FIG. 3 as seen from the rear in that figure; and FIG. 5 is a view in perspective of the frame member of FIG. 4.

Referring now to the drawings in more detail, and to FIGS. 1 and 2 in particular, for purposes of disclosure, the preferred form of the invention is illustrated as being incorporated in a sump pump motor 10 of the liquid level responsive type adapted to be mounted with its axis in a vertical position. More specifically, the motor includes a stator 11, conventionally formed with a core of laminated magnetic material, which is mounted in a shell member 12. The stator core is provided with suitable slots (not shown) for accommodating excitation windings 13 having end turns projecting beyond the sides faces of the core and with a bore 14 for receiving a rotor 15. The rotor, shown as being of the induction squirrel-cage type, is also constructed with a laminated core of magnetic material which carries a plurality of axially extending conductor bars (not illustrated) in suitable slots located near its outer periphery, the bars being connected at each end of the rotor by short circuiting rings 16 which may be cast integral with the bars in the usual way. In addition, each ring 16 is furnished with a number of angularly spaced apart fan blades 17 integrally provided thereon. The rotor 15 is securely attached to rotate with shaft 18, suitably supported on either side of the rotor by a pair of sleeve type bearings 19 (only one being illustrated in FIG. 2). The lower end of shaft 18, as viewed in FIG. 1, is connected to and drives a pump assembly (not illustrated) for immersion in a sump to remove water therefrom.

In accordance with the preferred embodiment of the present invention, at least bearing 19 of the upper end of the sump pump is carried by an end frame member 21 which, among other things, also serves as an air flow directing member and a support for a detachable cover plate member 22.

In particular, member 21, preferably cast from heat conductive material such as aluminum, is a single piece structure including a generally annular outer section 23 having means, such as a rabbet fit indicated by numeral 24, for engagement with the extreme end of shell 12. Through-bolts 25, which pass through member 21, are provided with nuts (not seen) for securing the stator, shell 12, and the end frames in bearing-aligned assembled relation. A number of spaced apart solid, slightly raised, spokes or arms 26a, 26b, 27a and 27b project radially inward from section 23 and terminate in an inner or centrally located cylindrical axial housing section 28. The housing includes spiders 29 for mounting bearing 19. In addition, a mass of lubricant impregnated material 31 surrounds bearing 19 within section 28 to form a lubricant reservoir and has a wick 32 projecting through the bearing into contact with shaft 18 for feeding lubricant from material 31 to the journal surfaces of the bearing. An end cap 33, having a central opening for accommodating shaft 18, closes the side of housing section 28 located toward the motor interior while a standard pressed-in oil cup 34 closes the other end of section 28.

It will be recalled from the preceding description that the present invention is incorporated in the upper part of a liquid level responsive sump pump adapted to be mounted with its shaft vertically disposed. Thus, in the illustrated form, member 21 is formed with an aperture 36 for accommodating a conventional motor controlling switch 37, connected in series with a power source through leads 38 and with winding 13, to turn the pump motor off and on in response to the liquid level of the sump. This may be accomplished by a float and lever arrangement in operative relation with the switch to provide an automatic control of the liquid level in the sump in the well known way. Aperture 36 is enclosed by an imperforate cover 39 having an extension 39a projecting radially beyond the circumference of shell 12 for housing the switch operating lever referred to above. Cover 39 is secured to member 21 by screws 41, and together with radial wall 42, furnishes a substantially imperforate surface between radial arms 26a and 26b.

In order to establish a positive and effective ventilating flow pattern for drawing cooling fluid; e.g., air, from the ambient surrounding the motor into the motor interior to cool heated motor components, such as the winding end turns, and to discharge the heated air to the ambient, in the preferred embodiment, member 21 is also integrally formed on opposite faces as sides with axially extending aligned generally curved or arcuate-shaped partitions 46, 47 which serve as air directing means. More specifically, partition 46 projects from the interior side of member 21, which faces the internal motor components, axially toward fan blades 17, internally of shell 12, and as best seen in FIG. 2, has its free edge disposed in the vicinity of the peripheral outermost corners of the blades. Preferably partition 46 is concentric with the rotor axis as well as with section 28 and has a circumferential length of approximated 300° to permit the motor controlling switch 38 to project into the motor interior for attachment onto the inner surface of shell 12, if so desired, thereby keeping the total axial length of the motor at a minimum. As viewed in the drawings, partition 47 projects from the exterior side of member 21 toward the ambient, with the free edge thereof being located axially above the four arms. Partition 47 includes a central curved portion which terminates at the ends in a pair of angularly spaced apart radial portions 48, 49, which in turn project approximately to the peripheral surface of the motor, that is, to outer section 23.

As seen in FIGS. 2 and 3, intake openings 51 are provided intermediate the partitions and housing section 28 for a major part of the housing circumference. These openings extend entirely through member 21 and furnish direct communication between the ambient and fan blades 17. A solid wall 23a projects inwardly from annular section 23, adjacent each of the radial partition portions 48 and 49, next to arms 26a and 26b, and terminates at the intake openings 51. Walls 23 furnish a solid passage from the motor circumference to at least some of the intake openings. For venting the air, which has been in heat transfer relation with the motor interior, exhaust openings 52 are arranged outwardly of partitions 46 and 47, between the partitions and the outer section 23 of the member. This construction results in divided paths of entry and exhaust through member 21.

In order to insure the divided air flow channels of ingress and egress through member 21 and to provide a splash-proof protected structure, cover 22 is mounted on the uppermost end of the motor, with its inner surface being in contact with the uppermost edge of partition 47 for the entire length of the edge. Cover 22 may be conveniently stamped into the desired shape from sheet material by a conventional punching and forming operation. Spaced apart upright studs 54, made integral with member 21, and cooperating screws 55 are employed in the illustrated form to mount cover 22 on member 21.

Thus, except for the edge of partition 47 and studs 51, cover member 22 is spaced from member 21 so that the members together create a separated air intake and exhaust flow pattern clearly shown in the drawings by the arrows in which recirculation of the vented, heated air into the motor is satisfactorily avoided. In addition, cover 22 fits sungly around the end of the bearing housing 28 having oil cup 34 and has its outer edge suitably formed with an axial extending flange 56 which projects downwardly over sections 48, 49 of partition 47.

With the foregoing arrangement, the cover is effective to deflect water that might splash upwardly onto the upper end of the motor, and the members insure against inducing dust or other foreign matter into the bearing of the machine. Of course, if desired, cover 39 may be dispensed with and cover 22 may extend outwardly beyond the machine circumference, with flange 56 extending axially below member 21 in radial spaced relation with annular section 23. However, by virtue of the present invention, this type of enlarged cover is not essential for achieving a satisfactory splash-proof arrangement.

In operation, cooling air is drawn by fan blades 17 into the motor from the surrounding ambient through the channel defined by cover 22, partition 47 and wall 23a, then through intake openings 51 to the fan blades, the air passing over bearing housing 28 to insure a cool housing. Blades 17 then force the air over a part of the rotor, as well as the winding end turns, and into the enclosure defined by the imperforate end 12a of shell 12 and partition 46 of member 21. The heated air is then driven through exhaust openings 52, past partition 47, which along with cover 22 insures against recirculation of the heated and vented air into the motor once again, and the air is finally discharged externally of the motor to the surrounding ambient.

Thus, it will be seen from the foregoing that by an inexpensive construction having relatively few low cost component parts, a positive flow pattern is provided with definite intake and discharge passageways which can be easily assembled and disassembled onto the motor without necessitating removal of many component parts. In addition, the arrangement prevents both the recirculation of the discharged heated air and the introduction of excessive moisture into the motor. Moreover, the entrance of dust and other foreign material into the bearing is also eliminated.

It should be appreciated from the foregoing that, although only the upper end frame has been described as including the present invention, the lower end frame, denoted by numeral 57, could also, if so desired, be constructed with the preferred embodiment. However, to do so, it will be recognized that the motor shaft must extend through the bearing housing and through the oil cup covering that end of the housing. Further, since the motor as illustrated is mounted vertically, in these applications holes, denoted by numeral 58 in FIG. 1, may be provided in shell 12, next to the winding end turns, since any water that is drawn into the motor in that area would fall away from the motor interior and into the sump. The present invention may, of course, be incorporated in motors employed in other than sump pump motor applications while still retaining the benefits and advantageous features thereof.

It should be apparent to those skilled in the art, that while I have shown and described what at present is considered to be the preferred embodiment of my invention in accordance with the patent statutes, changes may be made in the disclosed structure without actually departing from the true spirit and scope of this invention, and I therefore intend to cover in the following claims all such equivalent variations as fall within the invention.

What I claim as new and desire to secure by Letters Patent of the United States is:

1. A dynamoelectric machine comprising a stator, a rotor fixedly secured to a shaft, fan means rotatable with the shaft, and frame means for mounting bearing means to support the shaft for rotation relative to said stator and for directing the flow of air from the surrounding ambient of the machine into contact with said fan means and for discharging the air to the ambient, said frame means comprising at least one end frame member formed in one piece with an outer section, a central section for carrying said bearing formed nearer to the axis of the machine than said outer section, first and second partitions formed intermediate said outer and central sections, said first partition projecting from one side of end frame member axially away from the interior of said machine and terminating in a pair of angularly spaced apart ends in the vicinity of said outer section at locations spaced substantially less than 360°, said second partition projecting from the other side of said end frame member toward said fan means, air intake openings formed through said one piece member radially between said central section and both partitions for an angular length greater than 180° in communication with said fan means for introducing cooling air thereto, said end member including angularly spaced apart solid walls extending from said outer section to said air intake openings next to the first partition terminations for directing air from the ambient to said openings, air exhaust openings formed through said member radially between said outer section and both partitions spaced radially outwardly from said air intake openings and adjacent said partition terminations for discharging the air from said machine, and cover means mounted in spaced relation to said solid walls over the side of said end frame member adjacent said first partition to form radially divided channels for the respective intake and exhaust openings to provide radially separated air intake and exhaust flow paths repectively through the air intake and exhaust openings of the end frame member.

2. A dynamoelectric machine comprising a stator, a rotor fixedly secured to a shaft, fan means rotatable with the shaft, and frame means for directing the flow of air from the surrounding ambient of the machine into contact with said fan means and for discharging the air to the ambient, said frame means comprising at least one end frame member having an outer edge and first and second partitions intermediate said member with said first partition projecting axially away from the interior of said machine, with said second partition projecting toward said fan means, and with said second partition having an angular length greater than that of said first partition, a plurality of air intake openings formed radially inward of said partitions and through said member in direct communication with said fan means for introducing cooling air thereto, said end member including a solid wall extending from said outer edge to said air intake openings and terminating radially above said second partition for directing air from the ambient to said intake openings, said partitions and said outer edge defining a plurality of air exhaust openings through said member spaced radially outwardly from said air intake openings for discharging the heated air from said machine, and cover means mounted over the end of said end frame member transverse to the rotational axis of the machine adjacent said first partition in spaced axial relation to said solid wall to form distinct channels for the respective intake and exhaust openings to provide radially separated air intake and exhaust flow paths through the intake and exhaust openings of the one end frame member.

3. A dynamoelectric machine comprising a stator; a shell surrounding said stator; rotor fixedly secured to a shaft; fan means rotatable with the shaft; and frame means for mounting bearing means to support the shaft for rotation relative to said stator, for directing the flow of air from the surrounding ambient of the machine into contact with said fan means, and for discharging the air to the ambient; said frame means comprising at least one end frame member formed in one piece including a generally annular outer section for attachment to one end of the stator shell; a central section for carrying said bearing; and axially aligned first and second partitions formed intermediate said outer and central sections, said first partition projecting axially away from the interior of said machine and having a curved portion terminating in radial portions extending to said outer section, said second partition projecting toward said fan means and terminating in the vicinity thereof, said partitions and said central section defining a plurality of air intake openings through said one piece member in direct communication with said fan means for introducing cooling air thereto; said end member including a solid wall adjacent each radial portion of said first partition and extending from said outer section to said air intake openings for directing air from the surrounding ambient radially across said member to said intake openings; said partitions and said outer section defining a plurality of air exhaust openings through said member spaced radially outwardly from said air intake opening for discharging the air from said machine; an aperture provided between said solid walls and accommodating a motor control switch; and cover means mounted in spaced relation over the end of said end frame member in contact with the outermost edge of said first partition to form separate and distinct channels for the respective intake and exhaust openings to provide a positive flow path respectively through the intake and exhaust openings of the one end frame member.

4. For use in a dynamoelectric machine having a stator, a rotor, and fan means rotatably supported on a shaft, a single piece cast air directing member having opposed sides comprising an outer section, and first and second partitions located inwardly of said outer section, said first and second partitions projecting axially away from one another on either side of said member with each partition terminating in a free edge, a plurality of air intake openings being formed entirely through said member radially inward of said partitions for introducing cooling air axially through the member into the machine adjacent the fan means, a plurality of air exhaust openings being formed intermediate said partitions and said outer section for discharging air through said member, whereby said first and second partitions are effective to separate the intake air from the discharged air thereby providing distinct air intake and exhaust flow paths radially through said member and said member is readily castable.

5. For use in a dynamoelectric machine having a stator, a rotor, and fan means rotatably supported on a shaft, a one-piece air directing and bearing support member comprising an outer section, an inner section formed nearer the axis of the member than the outer section arranged to carry a bearing for rotatably supporting one end of the shaft, and first and second partitions located intermediate said outer and inner sections with said first partition projecting axially away from said second partition and terminating in a pair of generally radial portions extending to said outer section at diametrically opposed locations, said partitions and said inner section together defining a plurality of air intake openings through said one piece member for introducing cooling air into the machine adjacent the fan means, and said partitions and said outer section defining a plurality of air exhaust openings through said member spaced radially outwardly from said air intake openings for discharging air from the machine, whereby said first and second partitions are effective to divide the intake air from the discharged air thereby providing radially separated air flow paths through the air intake and discharge openings of said member.

6. For use in a dynamoelectric machine having a stator, a rotor, and fan means rotatably supported on a shaft, a one piece air directing and bearing support member cast of heat conductive material, said one piece member comprising a generally annular outer section, an inner section formed nearer the center of said member than the outer section to carry a bearing for rotatably supporting one end of the shaft, and axial aligned first and second partitions located intermediate the outer and inner sections, said first partition having a curved portion terminating in a pair of angularly spaced apart generally radial portions extending to said outer section, said second partition projecting axially at least to the end of the inner section, said partitions and said inner section together defining a plurality of air intake openings entirely through said cast member for introducing cooling air into the machine adjacent the fan means, said one piece member including a solid wall extending from said outer section to said air intake openings adjacent each generally radial portion of said first partition on the side thereof facing toward the other radial portion for directing air thereto, and said partitions and said outer section defining a plurality of air exhaust openings entirely through said cast member spaced radially outwardly from said air intake openings and angularly between said pair of generally radial portions of the first partition for discharging air from the machine, whereby said first and second partitions are effective to divide the air being introduced to the machine from the air being discharged from the machine to provide radially separated flow paths through the air intake and exhaust openings respectively of said cast member.

7. For use in a dynamoelectric machine having a stator, a rotor, and fan means rotatably supported on a shaft, an end frame member comprising an outer section; an inner section formed nearer the center of the member than said outer section for carrying bearing means to support one end of the shaft; a cooling fluid directing partition extending in a direction away from one side of said end frame member intermediate said outer and inner sections; said partition including a central portion terminating in a pair of angularly spaced apart end portions; said end portions projecting from said central portion to said outer section at locations spaced apart substantially less than 360°; at least one first opening formed through said member between said angularly spaced apart end portions and central portion of said partition and said outer section to permit the flow of cooling fluid through said member in one direction; at least one second opening formed entirely through said member between said partition and said inner section radially inward of said one first opening for an angular length of at least 180 degrees to permit the flow of cooling fluid through the member in a direction opposite to that permitted by the first opening at diametrically opposite locations, with wall means extending from said outer section to the second opening for assisting in the transfer radial of cooling fluid therebetween.

8. The end frame member of claim 7 in which the member includes an aperture entirely through the member angularly between two spaced apart imperforate wall means, radially outwardly of said inner section in diametrically opposed relation to the central portion of said partition for accommodating a dynamoelectric machine switch, and cover means mounted over the aperture, imperforate wall means, and openings, transversely to the axis of frame member for providing a splash proof arrangement and radially separated flow paths respectively through said first and second openings.

References Cited by the Examiner
UNITED STATES PATENTS

| | | | |
|---|---|---|---|
| 2,545,855 | 3/1951 | Luenberger | 310—58 |
| 2,825,827 | 3/1958 | Luenberger | 310—63 |

MILTON O. HIRSHFIELD, *Primary Examiner.*

ORIS L. RADER, *Examiner.*

L. L. SMITH, *Assistant Examiner.*